United States Patent [19]
Landez et al.

[11] Patent Number: 5,124,983
[45] Date of Patent: * Jun. 23, 1992

[54] ARBITRATION METHOD AND DEVICE FOR TRANSMIT MODE ACCESS TO THE TRANSMISSION MEDIUM OF A DISTRIBUTED SWITCHING NETWORK

[75] Inventors: Jean-Pierre Landez, Villejuif; Marc Boullet, Colombes, both of France

[73] Assignee: Alcatel Business Systems, Paris, France

[*] Notice: The portion of the term of this patent subsequent to Apr. 21, 2009 has been disclaimed.

[21] Appl. No.: 540,257

[22] Filed: Jun. 19, 1990

[30] Foreign Application Priority Data

Jun. 19, 1989 [FR] France .................. 89 08115

[51] Int. Cl.⁵ ............... H04J 3/02; H04J 3/24
[52] U.S. Cl. ................. 370/85.6; 370/85.11; 370/94.2; 340/825.51
[58] Field of Search ........... 370/85.6, 85.1, 85.2, 370/85.9, 85.11, 82, 94.1, 94.2, 67, 60, 60.1; 340/825.5, 825.51

[56] References Cited

U.S. PATENT DOCUMENTS

| | | | |
|---|---|---|---|
| 4,096,355 | 6/1978 | Rothauser et al. | 370/94.1 |
| 4,373,183 | 2/1983 | Means et al. | 370/85.6 |
| 4,593,282 | 6/1986 | Acampora et al. | 370/85.6 |
| 4,628,311 | 12/1986 | Milling | 340/825.5 |

FOREIGN PATENT DOCUMENTS

| | | |
|---|---|---|
| 121030 | 10/1984 | European Pat. Off. . |
| 122765 | 10/1984 | European Pat. Off. . |
| 229684 | 7/1987 | European Pat. Off. . |

OTHER PUBLICATIONS

French Search Report, dated Mar. 1, 1990, Examiner Canosa Areste C.

Primary Examiner—Benedict V. Safourek
Assistant Examiner—H. Kizou
Attorney, Agent, or Firm—Sughure, Mion, Zinn, Macpeak & Seas

[57] ABSTRACT

A method of arbitration for transmit mode access to the synchronous transmission medium of a distributed switching network whose architecture is based on a transmission medium time-shared between different stations, in which carries information in repetitive time positions, and in which a nominal time position being assigned on the basis of predetermined access criteria to respective stations communicating within the network, and spillover of stations outside the nominal time positions thus assigned is allowed. The arbitration method allocates an increasing access priority for an increasing seniority due to such spillover.

7 Claims, 3 Drawing Sheets

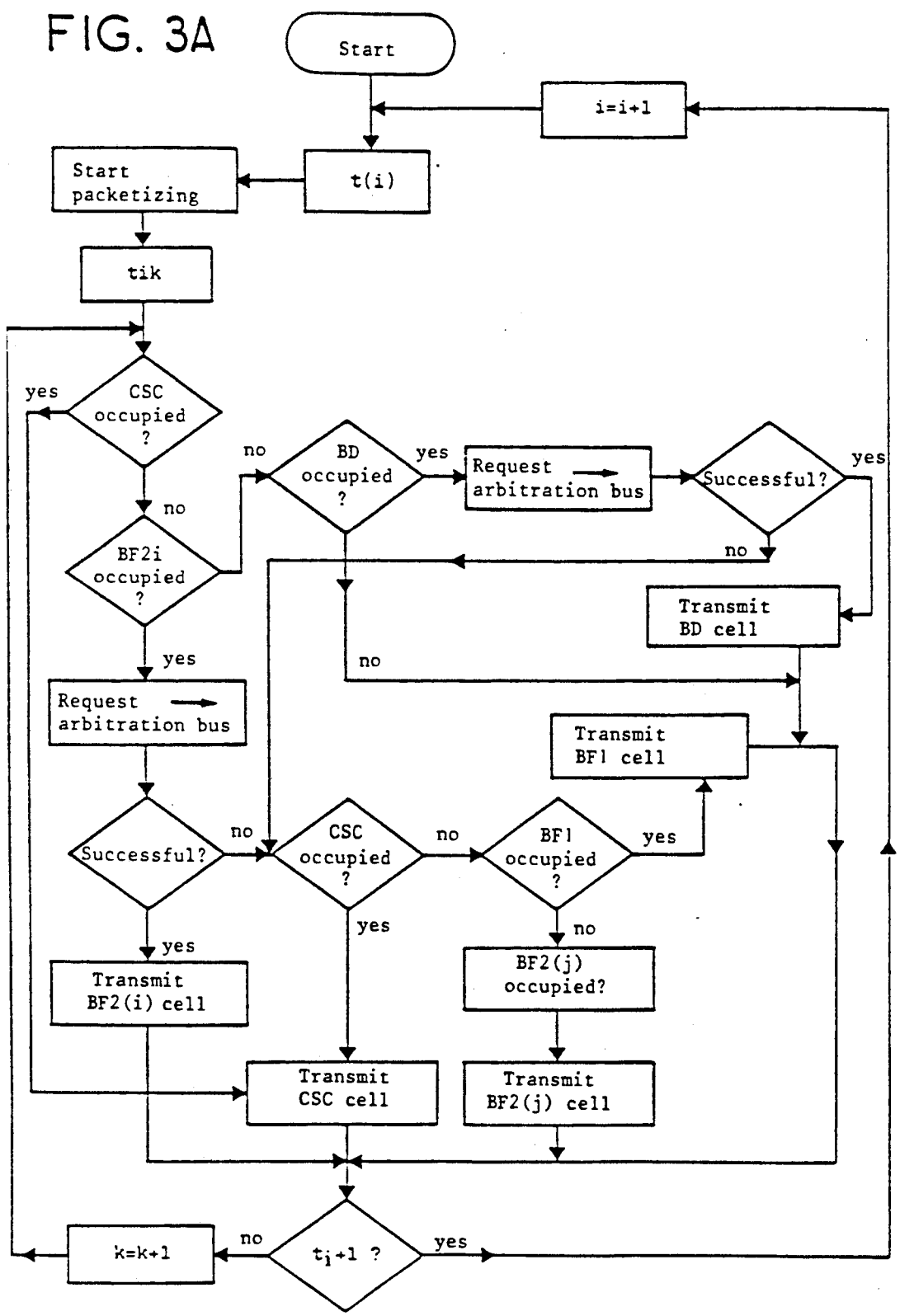

ARBITRATION METHOD AND DEVICE FOR TRANSMIT MODE ACCESS TO THE TRANSMISSION MEDIUM OF A DISTRIBUTED SWITCHING NETWORK

BACKGROUND OF THE INVENTION

The present invention concerns an arbitration method and device for transmit mode access to the transmission medium of a distributed switching network.

The present invention applies, for example, to a multiservice distributed switching network adapted to switch traffic in synchronous circuit-switched mode and in synchronous or asynchronous packet-switched mode, the architecture of said network being based on a transmission medium time-shared between different stations, in which:

the transmission medium is synchronous and structured in frames in turn structured in time slots in turn structured in time cells, the latter being sized to contain a communication entity which can be either a circuit-switched cell or a segmented packet-switched cell, an ideal (or nominal) time slot for access to the transmission medium in packet-switched mode is assigned to the respective stations communicating within the network, in each time cell and for all stations transmission medium access arbitration is applied to procure access to this medium, in decreasing priority order, to circuit-switched cells available at this time in any station, to synchronous segmented packet-switched cells available at this time in any station having an a nominal access time slot anterior to the time slot containing the time cell in question, to synchronous segmented packet-switched cells available at this time in the station having as its nominal access time slot the time slot containing the time cell in question, to asynchronous segmented packet-switched cells available at this time in any station having for its nominal access time slot a time slot anterior to the time slot containing the time cell in question, and to asynchronous segmented packet-switched cells available at this time in the station having for its nominal access time slot the time slot containing the time cell in question.

SUMMARY OF THE INVENTION

According to one characteristic of the invention, this method of arbitration for transmit mode access to the synchronous transmission medium of a distributed switching network, the architecture of said network being based on a transmission medium time-shared between different stations, and said medium being structured in repetitive time positions, is essentially characterized in that, a nominal access time position being assigned on the basis of predetermined access criteria to respective stations communicating within the network, and "spillover" of said stations outside the nominal time positions thus assigned being allowed, access contention resulting from such spillover is processed by comparing priority information relating to the various stations in contention obtained from initial priority information corresponding for each station to the nominal time position assigned to it on the basis of said access criteria, by modifying the latter in the sense of an increasing access priority for an increasing seniority due to such spillover.

Another object of the present invention is a device for implementing this method.

BRIEF DESCRIPTION OF THE DRAWINGS

Other objects and characteristics of the present invention will emerge more clearly upon reading the following description of one embodiment given with reference to the appended drawings in which.

DETAILED DESCRIPTION OF THE INVENTION

Figure 1:
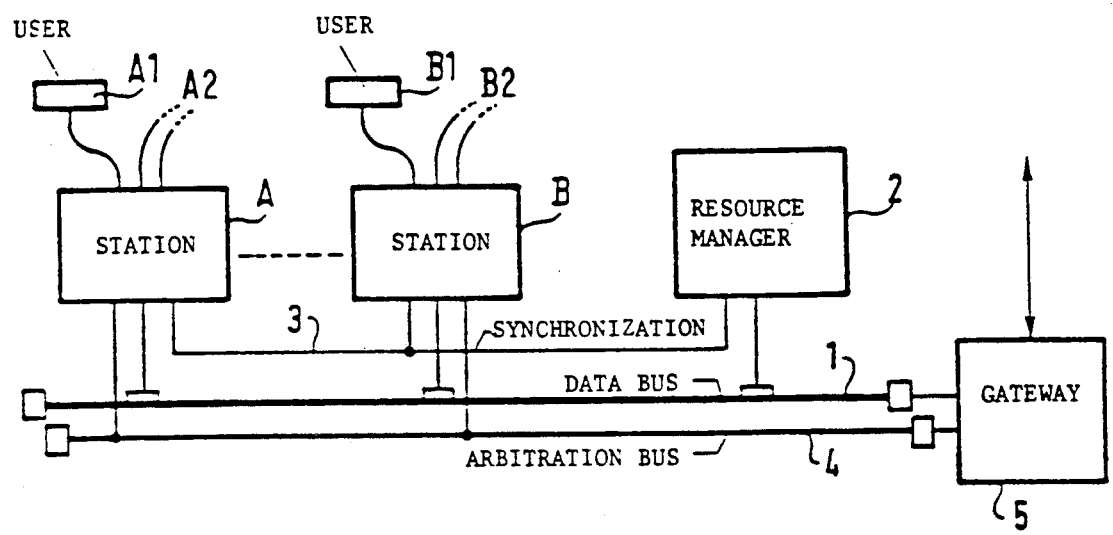
FIG. 1 shows the general block diagram of a distributed switching network in accordance with the invention.

FIG. 1 shows a set of "n" stations A and B (n=2 in the example) of a distributed switching network communicating with each other by means of a transmission medium 1 referred to hereinafter as the data bus, time-shared between the various stations, each station itself constituting a point of concentration of traffic from various users A1, A2, etc, B1, B2, etc.

Figure 2:
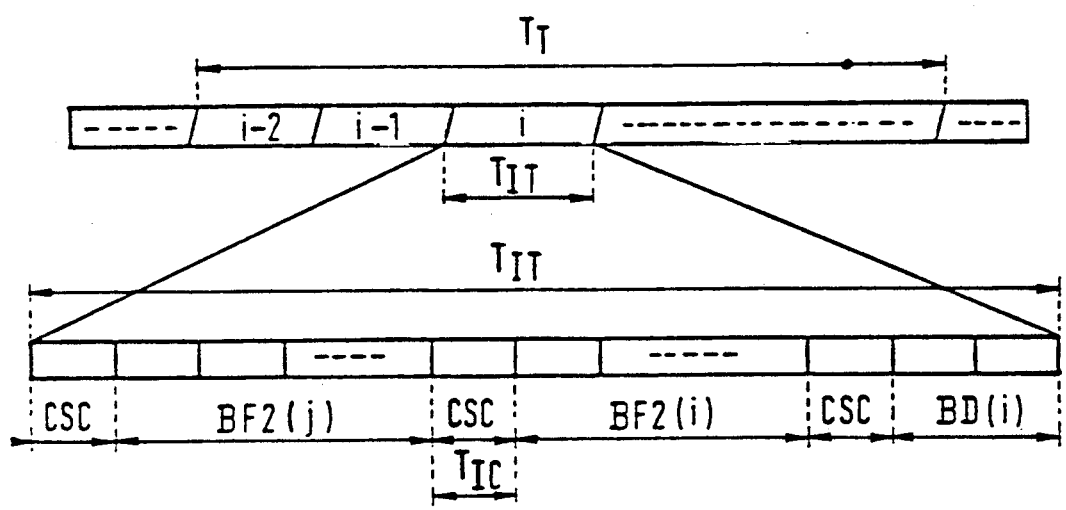
FIG. 2 shows how the transmission medium of a network in accordance with the invention is structured and one example of traffic allocation on this medium.

As shown in FIG. 2, the data bus is a synchronous bus structured in repetitive frames of duration $T_T$ in turn structured in time slots of duration $T_{IT}$ in turn divided into time cells of duration $T_{IC}$.

Each time cell is sized to contain either a circuit-switched cell or a segmented packet-switched cell.

This network can service various types of traffic:

in synchronous circuit-switched mode, with a predetermined fixed data rate, for example 64 kbit/s for a 32-channel PCM voice multiplex, the speech information carried by the voice multiplexing constituting said circuit-switched cells, in synchronous packet-switched mode, with a varied and varying data rate, for example information from facsimile terminals, in asynchronous packet-switched mode, for example information from computer terminals.

The expression "segmented packet-switched cells" means fragments of packets each including the destination address of the packet and being the same size as a circuit-switched cell.

For each time cell on the data bus the circuit-switched cells take priority so that this type of traffic can be carried without delays.

The packet-switched mode traffic relating to a station 1 is nominally carried by a time slot $IT_i$ of the same rank i (i.e., in the same temporal position) in successive frames, called the nominal access time slot of the station concerned, allocated to it beforehand by a resource management controller 2 according to the capacity of the transmission medium, the nominal capacity already allocated to calls in progress at a given time and the nominal capacity required by the station requesting access to the network at this time, so that all the traffic corresponding to these nominal capacities can be carried without delays.

The resource management controller does not form any part of the present invention and will therefore not be described in more detail.

By establishing the correspondence between the nominal (or ideal) access time ti of a station I to the transmission medium and the end of packetization (effected in the various stations) of the data to be transmitted on this medium at this time the delay with which users access the transmission medium in the case of packet-switched mode traffic is minimized.

By setting the frame duration as equal to the packetization time, this amounts to fixing the start of packetization of the data relating to a station I to be transmitted at the nominal access time ti with the preceding access time of this station, in other words $ti - T_T$.

FIG. 1 shows a link 3 effecting this synchronization of the stations on the basis of ideal access times supplied by the resource management controller 2.

By allowing synchronous packet-switched mode traffic from a station to "spill over" into cells of time slots not initially assigned to this station, in the event of synchronous packet-switched mode traffic "peaks" (as compared with the allocated nominal capacity), and by providing also for asynchronous traffic to "fill in" cells not occupied by synchronous traffic in the event of synchronous traffic "troughs", the efficiency with which the transmission medium is used is optimized.

Figure 3B:
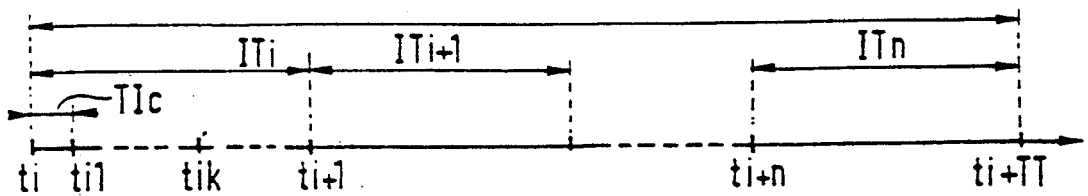
FIG. 3A shows the algorithm managing access to the transmission medium as used in each station, the various times used to define the various stages of this algorithm being shown in the timing diagram in FIG. 3B.

The algorithm managing access to the transmission medium employed in each station will now be described with reference to FIGS. 3A and 3B.

At nominal access time ti (start of a nominal access time slot ITi) begins the packetization of data relating to a station I to which this time slot is nominally assigned and which will (theoretically) be transmitted on the data bus at the next frame time, in other words $ti + T_T$.

At this time ti the priorities for transmission on the data bus are examined, on the one hand for circuit-switched mode data stored in the various stations in a register (or buffer) CSC, and on the other hand for data already packetized whose packetization began at the preceding frame time, in other words $ti - T_T$, and which is located in a buffer BF2 (BF2 (i) for station I) for synchronous packet-switched mode traffic or in a buffer BD (BD (i) for station I) for asynchronous packet-switched mode traffic.

Access to the data bus at the time ti is managed in the following manner:

If data is present in a CSC buffer of any station its content has priority for being output onto the data bus at the rate of one circuit-switched cell per time cell "tik" within the time slot ITi in question.

If the CSC buffers are empty, the algorithm determines if data is present in the BF2 (i) buffer of the station I in question. If so, the content of the latter is not output onto the data bus immediately, but only after arbitration of any access contention with traffic of the same kind "spilled over" from stations already previously serviced on the data bus, this arbitration being carried out by an arbitration mechanism to be described later. If the station I request to the arbitration mechanism succeeds the content of the BF2 (i) buffer is output onto the data bus time cell by time cell as long as the next nominal access time ($t_{i+1}$) nominally assigned to a station I+1 is not reached, priority being given for each time cell to any circuit-switched cell that may be present at this time in any station.

If the BF2 (i) buffer is empty the content of the BD (i) buffer is examined. If this buffer is full it is output cell by cell provided that the next nominal access time ($t_{i+1}$) is not reached, priority being given for each time cell to any circuit-switched mode traffic to be serviced at the time in question and to any asynchronous packet-switched mode traffic "spilled over" from stations already previously serviced on the data bus.

On failure of a BF2 (i) or BD (i) buffer access request after application of the arbitration mechanism the traffic from the BF2 (j) or BD (j) buffer of the station J selected after arbitration as having the highest priority is output onto the data bus, cell by cell, provided that the next nominal access time ($t_{i+1}$) is not reached, priority being given for each cell to any circuit-switched mode traffic to be serviced at the time in question.

When the next nominal access time is reached, the process described is repeated.

It is possible to provide a supplementary priority level between circuit-switched mode traffic and packet-switched mode "spillover" traffic, to enable the processing with the corresponding priority of "external" synchronous packet-switched mode traffic, by which is meant traffic from outside the network entering the network via a gateway 5 (FIG. 1).

In FIG. 3A, BF1 denotes the register or buffer in which the traffic from this gateway is stored, the gateway also including a buffer CSC for circuit-switched mode traffic and a buffer BD (i) for asynchronous packet-switched mode traffic respectively processed with the same priority as "internal" circuit-switched mode traffic or "internal" asynchronous packet-switched mode traffic generated by the stations.

It will be noted that any such introduction of a supplementary priority level constitutes an additional cause for "spillover" of packet-switched mode traffic generated by the stations.

Figure 4:
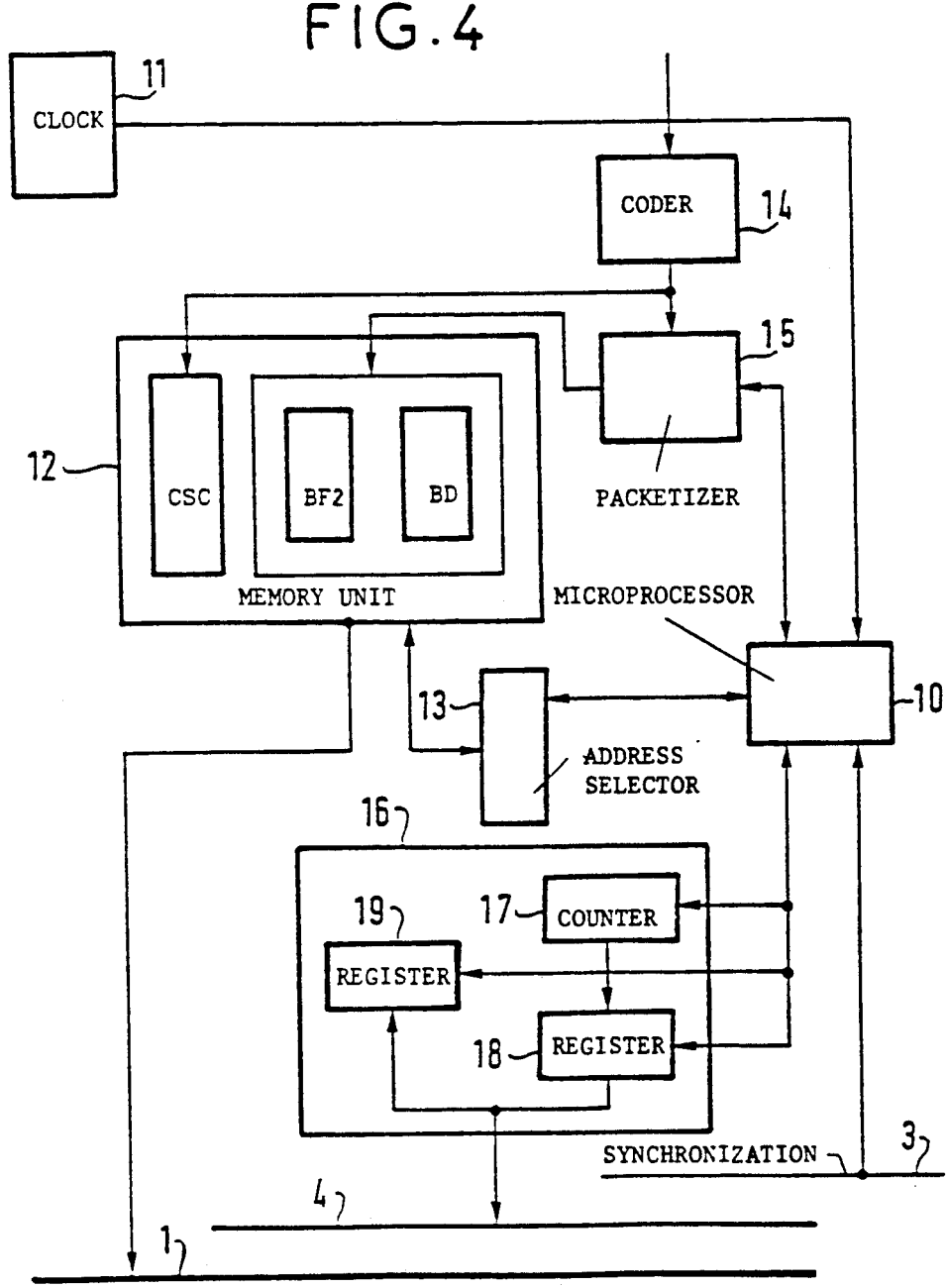
FIG. 4 shows the general block diagram of a station including an arbitration device in accordance with the invention.

There will now be described with reference to FIG. 4 the block diagram of each station enabling application of the algorithm described above. Only the component parts of each station specific to one transmission direction, namely from the station to the data bus, will be described.

The block diagram is based on a microprocessor 10 which communicates with various components including:

a clock 11 supplying it with the repetition frequency of time cells, time slots and frames on the data bus, an arbitration unit 16 communicating with an arbitration bus 4 common to the various stations, a memory unit 12 containing the CSC, BF2 and BD buffers (CSC, BF1 and BD buffers in the case of a gateway), with which it communicates via an address selector 13.

The data stored in these buffers originates from a coder 14 in the case of circuit-switched mode traffic or from a packetizer 15 in the case of packet-switched mode traffic, the microprocessor 10 controlling the packetizer to synchronize packetization as described above.

The coder and the packetizer are well known in themselves and will not be described here. Suffice to say that the packetizer forms data into packets comprising data to be transmitted and signalling information for routing it and that the coder digitizes the analog signals from the various users connected to the station concerned, a plurality of encoders possibly constituting a PCM voice multiplex, the signalling information being transmitted separately from the speech information (or bytes).

Information applied to the arbitration bus via the arbitration unit 16 is obtained by adding information relating on the one hand to the priority of the traffic in the buffers of the memory 12 detected as occupied (by the microprocessor 10 via the address selector 13) and on the other hand to the seniority of the traffic not yet serviced at the time in question (in order to authorize "spillover" as explained previously).

Arbitration is carried out by comparing the information applied to the arbitration bus at the same time by the various stations.

To be more precise, arbitration is carried out by writing the bus followed by reading it, any coincidence of the information written then read by a station on the arbitration bus indicating settling of the contention in favor of that station. In this instance, as writing to the arbitration bus means that the bus changes state on application of a "0" bit, the address regarded as having the highest priority after subsequent reading of the bus is that having the greatest number of "0" bits.

The information concerning the priority of the various buffers and the seniority of the traffic to be serviced is derived accordingly.

To produce arbitration information concerning the seniority of the traffic to be processed, the arbitration unit 16 includes a counter 17 initially loaded by the microprocessor 10 with the nominal access time slot for the station concerned.

The microprocessor 10 of each station knows the nominal access time slot of the station, which is communicated to it by the resource management controller 2 via the synchronization link 3 (FIG. 1).

The counter 17 is decremented at each time cell and for each of the stations in contention, in other words having traffic to be serviced simultaneously and reset with the nominal access time slot at the end of the counting cycle.

The arbitration unit 16 also includes a register 18 for storing information to be written on the arbitration bus and a register 19 for storing information read from the arbitration bus, both controlled by the microprocessor 10.

The microprocessor 10 of a station uses the result of arbitration to select the address of the buffer of that station regarded as having the highest priority at the end of the arbitration.

Because of the rotating priority resulting from the presence of the counters the situation is avoided where a station to which the lowest priority nominal access time slot (theoretically at the end of the frame) has been allocated is penalized by "spillover" from stations which preceded it in time, in other words which were assigned higher priority nominal access time slots, and which would otherwise take priority again in subsequent frames.

We claim:

1. A method of arbitration for access to a synchronous transmission medium of a distributed switching network by plural stations desiring to transmit signals over said medium, said transmission medium being time-shared between said plural stations and carrying information structured in repetitive time slots, characterized in that a nominal access time slot is assigned to each of said stations communicating within said network, and spillover is allowed wherein each of said stations is permitted to transmit outside of its nominal time slot thus assigned, wherein access contention resulting from such spillover is processed by comparing modified priority information relating to the various stations in contention, said modified priority information being obtained from (1) initial priority information corresponding for each station to the nominal time slot assigned to it, and (2) seniority information relating to the period of time for which a station has been waiting to transmit.

2. A method according to claim 1 for a multiservice distributed switching network adapted to switch traffic in synchronous circuit-switched mode and in synchronous or asynchronous packet-switched mode, characterized in that:

transmission in said medium is synchronous and structured in frames in turn structured in time slots in turn structured in time cells, the latter being sized to contain a communication entity which can be either a circuit-switched cell or a segmented packet-switched cell, a nominal time slot for access to the transmission medium in packet-switched mode is assigned to each station communicating within the network, in each time cell and for all stations, transmission medium access arbitration is applied to procure access to said medium, with said initial priority information granting priority in a given time cell, in decreasing priority order, to circuit-switched cells available during said given time cell in any station, to synchronous segmented packet-switched cells available during said given time cell in any station having a nominal access time slot anterior to the time slot containing said given time cell, to synchronous segmented packet-switched cells available during said given time cell in the station having as its nominal access time slot the time slot containing said given time cell, to asynchronous segmented packet-switched cells available during said given time cell in any station having for its nominal access time slot a time slot anterior to the time slot containing said given time cell, and to asynchronous segmented packet-switched cells available during said given time cell in the station having for its nominal access time slot the time slot containing said given time cell.

3. A method according to claim 2 characterized in that the modified priority information is obtained by adding to the initial priority information of the traffic type in question information relating to the seniority of the traffic not serviced during said given time cell.

4. A method according to claim 1, wherein said seniority information accords a higher priority to each station in accordance with longer periods of time for which a station has been waiting to transmit.

5. A device for implementing a method of arbitration for access to a synchronous transmission medium of a distributed switching network by plural stations desiring to transmit signals over said medium, said transmission medium being time-shared between said plural stations and carrying information structured in repetitive time slots, characterized in that a nominal access time slot is assigned to each of said stations communication within said network, and spillover is allowed wherein each of said stations is permitted to transmit outside of its nominal time slot thus assigned, said device including arbitration means for arbitrating access contention resulting from such spillover, said arbitration means including comparison means for comparing modified priority information relating to the various stations in contention, said modified priority information being obtained from (1) initial priority information corresponding for each station to the nominal time slot assigned to it, and (2) seniority information relating to the period of time for which a station has been waiting to transmit, characterized in that said arbitration means comprises an arbitration bus common to the various stations, write means at a given station in contention for writing its priority information for each time slot, read means at said given station in contention for reading priority information present on the bus, and said comparing means for comparing the read and written priority information which, if coincident, indicates settling of the contention in favor of said given station.

6. Device according to claim 5, characterized in that said transmission medium carries information structured in repetitive frames in turn structured in said time slots in turn structured in time cells, and wherein seniority information is provided by a counter at each station initially loaded with a value corresponding to the nominal access time slot of the corresponding station and decremented at the occurrence of each time cell for each of the stations in contention said counter being reset to said value at the end of a predetermined counting cycle.

7. A method of arbitration for access to a synchronous transmission medium of a distributed switching network by plural stations desiring to transmit signals over said medium, said transmission medium being time-shared between said plural stations and carrying information structured in frames in turn structured in time slots in turn structured in time cells, said time cells being sized to contain a communication entity which can be either a circuit-switched cell or a segmented packet-switched cell, a nominal time slot for access to the transmission medium in packet-switched mode being assigned to each station communicating within the network, and in each time cell and for all stations, said method comprising arbitrating access to said transmission medium to procure access to said medium on the basis of initial priority information and seniority information, with said initial priority information granting priority in a given time cell, in decreasing priority order, to circuit-switched cells available during said given time cell in any station, to synchronous segmented packet-switched cells available during said given time cell in any station having a nominal access time slot anterior to the time slot containing said given time cell, to synchronous segmented packet-switched cells available during said given time cell in the station having as its nominal access time slot the time slot containing said given time cell, to asynchronous segmented packet-switched cells available during said given time cell in any station having for its nominal access time slot a time slot anterior to the time slot containing said given time cell, and to asynchronous segmented packet-switched cells available during said given time cell in the station having for its nominal access time slot the time slot containing said given time cell, and said seniority information relating to the period of time for which a station has been waiting to transmit.

* * * * *